UNITED STATES PATENT OFFICE.

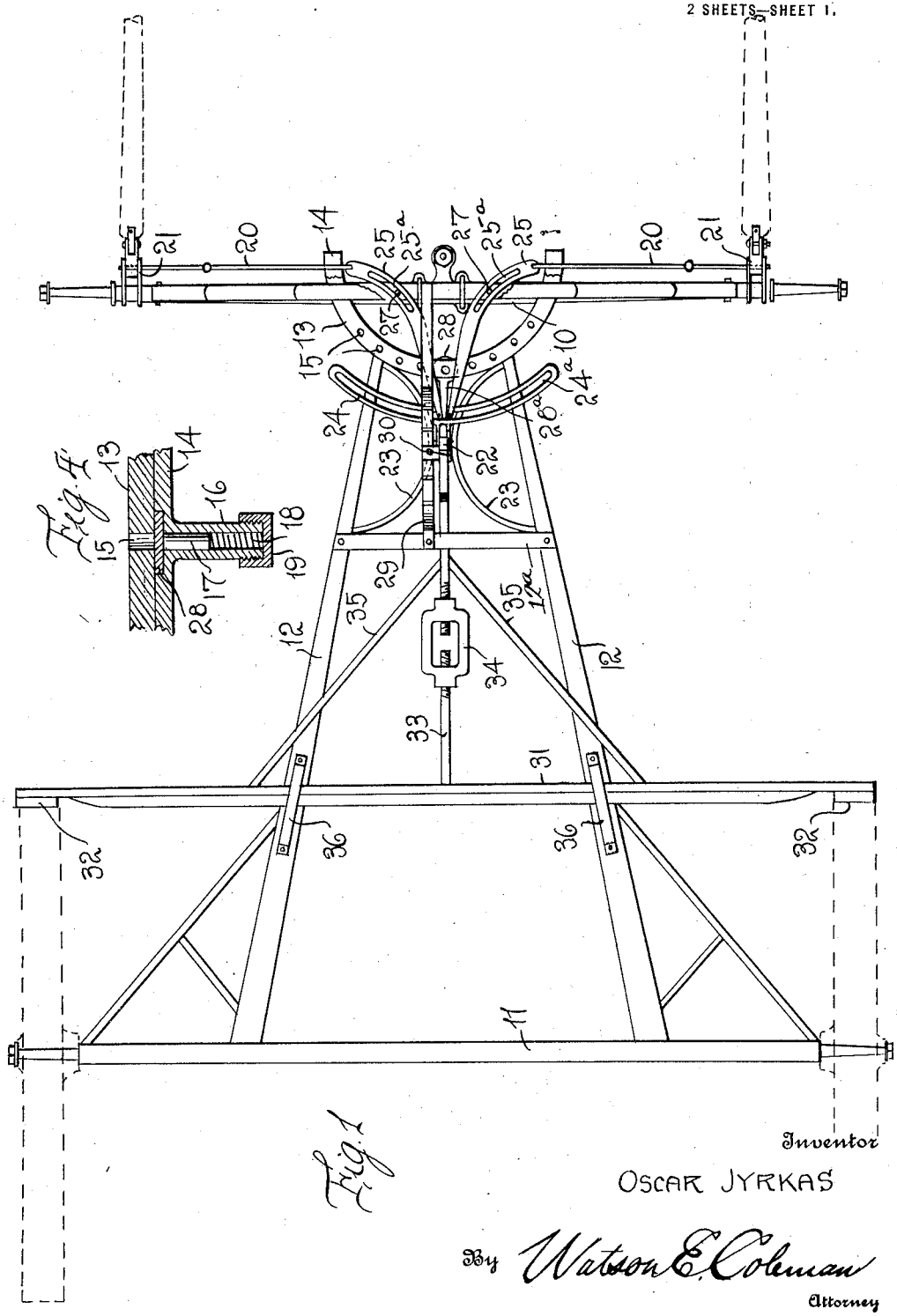

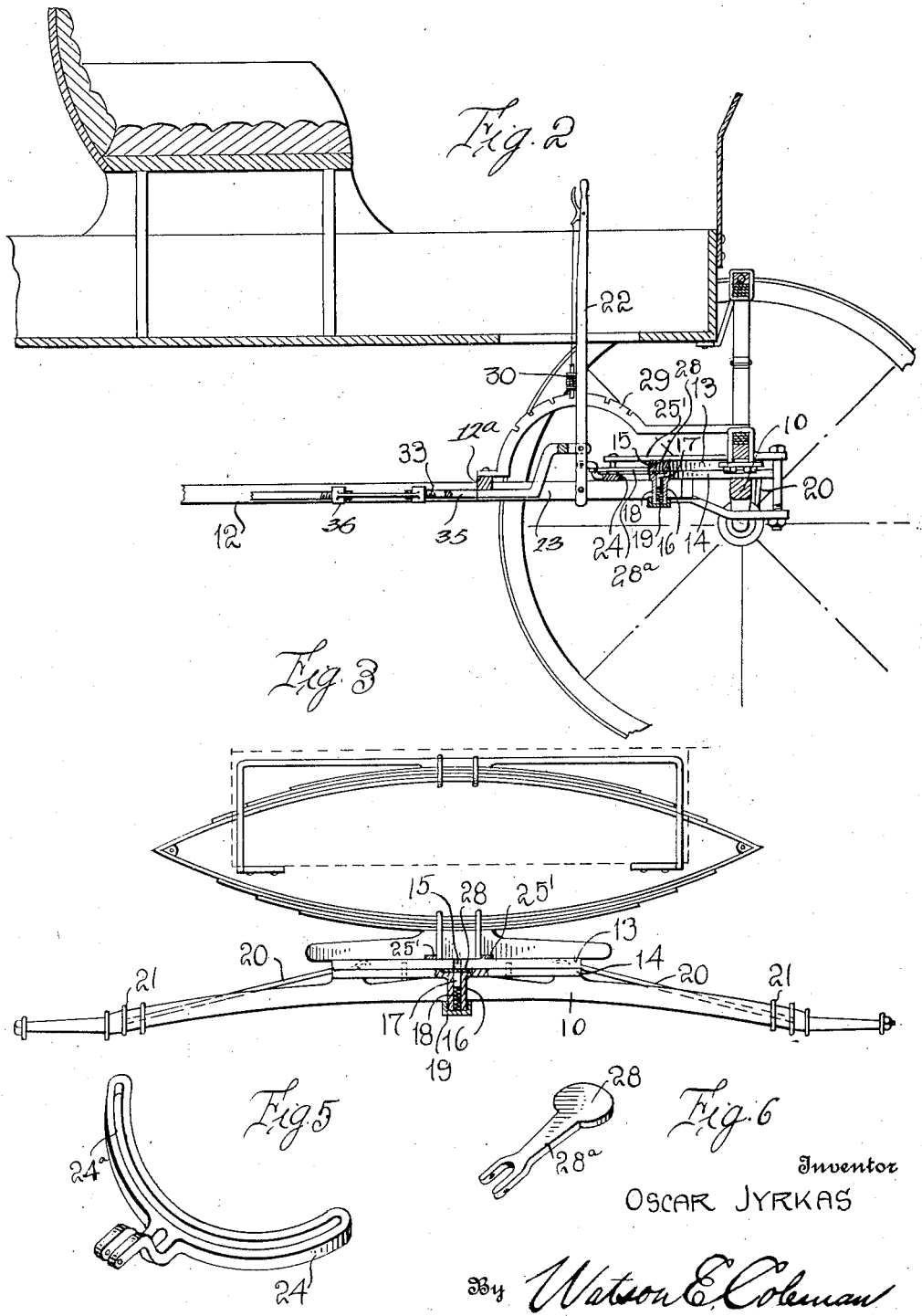

OSCAR L. JYRKAS, OF NEW YORK MILLS, MINNESOTA.

HORSE-DETACHER AND VEHICLE-LOCK.

1,338,138.  Specification of Letters Patent.  Patented Apr. 27, 1920.

Application filed August 11, 1917, Serial No. 185,755. Renewed October 30, 1918. Serial No. 260,378.

*To all whom it may concern:*

Be it known that I, OSCAR L. JYRKAS, a citizen of the United States, residing at New York Mills, in the county of Ottertail and State of Minnesota, have invented certain new and useful Improvements in Horse-Detachers and Vehicle-Locks, of which the following is a specification, reference being had to the accompanying drawings.

This invention relates to horse detaching devices and particularly to that class of detachers wherein the draft animals are detached from the vehicle by the operation of a lever or other manually operable device.

The primary object of my invention is to provide a horse detacher which shall be very simple in construction and effective in operation and a further object of the invention is to provide means operable simultaneously with the detaching of the draft animals for applying a brake to the vehicle and for locking the front axle from rotatable movement on its king bolt so as to prevent the vehicle from sluing around.

Other objects will appear in the course of the following description.

My invention is illustrated in the accompanying drawings, wherein—

Figure 1 is a top plan view of the running gear of a wagon showing my detaching device applied thereto;

Fig. 2 is a vertical longitudinal section thereof;

Fig. 3 is a rear view of the front axle, the lower fifth wheel being partly in section to show the latch 17;

Fig. 4 is an enlarged vertical sectional view of the upper and lower fifth wheels and the latching means;

Fig. 5 is a perspective view of the arcuate member for operating the retractors; and Fig. 6 is a perspective view of the detent for holding the bolt 17 from operation.

In the drawings it will be seen that I have shown the running gear of a vehicle as comprising or including the front axle 10, the rear axle 11 and the reaches 12 which are connected to the rear axle by means of braces or in any other suitable manner. The reaches 12 are connected by means of a cross brace 12ª. I do not wish to be limited to the particular construction of this running gear. The running gear also includes a fixed fifth wheel 13 which is operatively mounted upon the forward end of the running gear so as to be fixed relative to the body of the wagon and a fifth wheel 14 which is operatively connected to the axle to rotate therewith, the fifth wheel 14 being disposed beneath the fifth wheel 13 and in register therewith. The fifth wheel 13 is formed with a plurality of perforations 15 and attached to the fifth wheel 14 is a bolt casing 16 having therein a bolt 17, a spring 18, and a removable cap 19.

The spring 18 acts to urge the bolt 17 upward through any one of the perforations 15 and thereby lock the front axle in predetermined relation to the longitudinal axis of the wagon. Normally, however, this bolt 17 is held retracted by means which will be later described.

Slidingly mounted in the ends of the fifth wheel 14 are bolts 20 which are adapted to engage with the eyes on the ends of the shafts or on the ends of a pole yoke or with any other draft devices. These bolts 20 pass through apertured lugs 21 mounted upon the axle between which apertured lugs the eyes of the draft devices are disposed. When the bolts are projected, the draft devices are engaged with the axle and when the bolts are retracted the draft devices are disengaged from the axle.

For the purpose of projecting and retracting these bolts 20, I provide a lever 22 which is pivotally mounted between semi-circular irons 23 attached to the reach members 12 or the lever may be mounted in any other suitable manner. This lever above its point of pivotal connection is operatively connected to a semi-circular yoke 24 having a longitudinally extending slot 24ª. This yoke and slot, but particularly the slot, are concentric to the fifth wheels 13 and 14 but are disposed rearward of these fifth wheels and operatively connected to the lever in any suitable manner are the curved retractors 25. These retractors are longitudinally slotted as at 25ª and operate upon pins or bolts 27 projecting upward from the front axle. The outer ends of the retractors, which are turned in opposite directions, are operatively connected to the bolts 20. It will now be obvious that when the lever 22 is pulled back, the retractors will be drawn back and, operating against the pins 27, will cause a retraction of the bolts 20 to thereby release the draft animals. It will be obvious that a forward movement of the lever, however, will urge the retractors forward and the pins 27 will cause the forward ends of the retractors to move laterally, thus projecting the bolts 20 to their operative position. Also pivotally connected to the lever is a rod 28ª having at its end a plate 28. This plate is normally disposed immediately above the bolt 17 and between the end of the bolt casing and the fifth wheel 13 so that it prevents the projection of the locking bolt 17. If, however, the lever be withdrawn or retracted, the plate 28 will be withdrawn from above the locking bolt and the locking bolt will be projected by the spring and lock into one of the perforations 15 of the fifth wheel 13, thus immediately locking the movable fifth wheel 13 to the fixed fifth wheel 14 and preventing any rotative movement of the front axle. The lever 22 moves over a sector rack 29 whose forward end is mounted upon the front spring of the vehicle and whose rear end is mounted upon the running gear in any suitable manner adjacent the transverse brace 12ª, this rack being provided with notches and the lever being provided with a manually actuatable locking detent 30 of the usual form to engage in these notches so that the lever may be held in its retracted or projected position. This detent 30 is of course connected to a hand lever mounted upon the upper end of the lever 22.

Disposed across the rear end of the reach members 12 forward of the rear axle is a brake beam 31 carrying on its ends the brake shoes 32. This brake beam has a medially disposed rod 33 which extends forward and is operatively connected to the lever 22 above the pivot of the lever. Preferably this rod 33 is formed in two sections connected by a turn buckle 34, or connected in any other suitable manner so that the rod 33 may be lengthened or shortened so as to adjust the brake shoes. Preferably also the brake beam is braced from the rod 33 by means of the angular braces 35. The brake beam is guided upon the reach members 12 by means of the straps 36 attached to the reach members and arching over the brake beam.

The operation of my invention will be obvious from what has gone before. When there is danger of an animal running away, and it is desired to detach the animal from the vehicle, the lever 22, which is disposed behind the dash or in any other suitable position, is pulled rearwardly by the driver, thus retracting the bolts 20 and releasing the draft animals. At the same time the detent plate 28 is retracted so that the bolt 17 will be projected into engagement with the fixed fifth wheel, thus locking the fifth wheels together and locking the front axle from rotation in a horizontal plane. Simultaneously with this, the brake beam will be forced rearward and the shoes brought into engagement with the rear wheels, thus checking the speed of the vehicle. After a detachment of the draft animals they may be again attached to the vehicle by unscrewing the cap 19 from the casing bolt 17, taking out the coil spring and the bolt, and replacing the member 28 below the lower end of the bolt casing and then shifting the lever so as to project the bolts 20, thus locking the draft devices to the axle.

Having described my invention, what I claim is:

1. A vehicle comprising a body and a front axle pivotally mounted on the body for rotation in a horizontal plane relative to the body, shiftable means carried by the front axle for engaging draft devices, and means for shifting said engaging means out of operative position including an arcuate yoke extending concentrically to the pivotal axis of the front axle and mounted upon said body with which the shiftable engaging means has operative engagement in all positions of the axle relative to the body, and manually operable means for shifting said yoke to release said means for engaging the draft devices.

2. A vehicle having a body and a front axle, pivotally mounted for rotation in a horizontal plane relative to the body, shiftable means carried by the front axle for engaging draft devices, said means being shiftable into or out of operative position, and means for shifting said shiftable engaging means comprising a lever extending up through the body, an arcuate yoke carried by said lever, the yoke being approximately concentric to the rotative axis of the axle and having sliding operative engagement with said shiftable engaging means, whereby said engaging means may be shifted with the axle and yet maintain engagement with the yoke.

3. A vehicle having a body and a front axle pivotally mounted for rotation in a horizontal plane relative to the body, transversely shiftable bolts operatively supported upon the front axle, operating devices for said bolts carried by the front axle, and means for shifting the operating devices to retract the bolts, including a lever mounted on the body and an arcuate yoke having sliding engagement with the operating devices, said yoke extending concentrically to the pivotal axis of the axle.

4. A vehicle including a body and a front axle pivoted for movement in a horizontal plane relative to the body, draft devices, means mounted on the axle for detachably connecting the draft devices to the axle, operating members connected to said means extending rearward therefrom, means for locking the front axle from movement in a horizontal plane relative to the axis of the vehicle, means for releasing said locking means, a lever mounted on the body, and an arcuate slotted yoke carried by said lever and with which said releasing means and the operating members for the draft engaging means are slidingly connected.

5. A vehicle having a body and a front axle mounted for movement in a horizontal plane relative to the body, a fifth wheel connected to the axle, a fifth wheel connected to the body and having perforations, a bolt mounted upon the first named fifth wheel and coacting with said perforations, means for normally holding said bolt from projection, bolts mounted on the front axle for engaging draft devices, members operatively connected to said bolts and extending rearward therefrom, said members being arranged to retract the bolts upon a rearward movement, and manually operable means for actuating said operating members and said bolt retracting means comprising a lever mounted on the body and an arcuate yoke connected to the body, said arcuate members and said bolt releasing means being operatively connected to said yoke to shift thereon, whereby to permit the axle to shift relative to the body, without disengaging said yoke from the operating means and the bolt releasing means.

6. A vehicle having a running gear including a front axle pivotally mounted for rotation in a horizontal plane, a fifth wheel attached to the front axle and rotating therewith, a fifth wheel attached to the vehicle body and having a plurality of perforations, a spring actuated bolt carried upon the first named fifth wheel and adapted to be projected into the perforations of the second named fifth wheel, a lever mounted on the body of the vehicle, a detent plate disposed between the bolt and the perforated fifth wheel and operatively connected to the lever, shiftable means on the front axle for engaging draft devices, and means operatively connecting said shiftable means to the lever whereby upon a retraction of the lever the engaging means will be shifted to an inoperative position and the detent plate retracted to permit the projection of the bolt.

7. A vehicle having a running gear including a front axle pivotally mounted for rotation in a horizontal plane, a fifth wheel attached to the front axle and rotating therewith, a fifth wheel attached to the vehicle body and having a plurality of perforations, a spring actuated bolt carried upon the first named fifth wheel and adapted to be projected into the perforations of the second named fifth wheel, a lever mounted on the body of the vehicle, a detent plate disposed between the bolt and the perforated fifth wheel and operatively connected to the lever, shiftable means on the front axle for engaging draft devices, means operatively connecting said shiftable means to the lever whereby upon a retraction of the lever the engaging means will be shifted to an inoperative position and the detent plate retracted to permit the projection of the bolt, a rear axle having wheels thereon, a brake beam having brake shoes coacting with said wheels, and a connection between said brake beam and lever whereby upon a retraction of the lever the brakes will be applied.

8. A vehicle having a running gear including reach members, a rear axle mounted thereon and having rear wheels, a front axle rotatably mounted for movement in a horizontal plane and having pairs of lugs adjacent its ends, a fifth wheel attached to the front axle, a fifth wheel operatively connected to the reach members, said last named fifth wheel being perforated, a spring actuated bolt carried upon the first named fifth wheel and engageable with any of the perforations of the second named fifth wheel, a lever operatively mounted upon one of the reach members, a plate normally disposed between the extremity of the bolt and the perforated fifth wheel and holding the bolt retracted, said plate being operatively connected to the lever, sliding bolts having their inner ends slidingly mounted in the rotatable fifth wheel and having their outer ends slidably mounted in said lugs, said bolts being adapted to engage draft devices, arcuate slotted members having their forward ends outwardly turned and engaged with the last named bolts and their rear ends operatively connected to the lever, pins extending from the front axle and through the slots of said arcuate members, a brake beam slidably mounted upon the reach members and having brake shoes coacting with the brake beam, and an adjustable connection between said brake beam and said lever whereby upon a retraction of the lever the draft devices will be disengaged, the detent plate will be retracted to permit the projection of the bolt, and the brake beam will be shifted rearward to apply the brakes.

In testimony whereof I hereunto affix my signature in the presence of two witnesses.

OSCAR L. JYRKAS.

Witnesses:
LYDIA HAARAH,
CHAS. G. HYVY.